(12) United States Patent
Mino et al.

(10) Patent No.: US 10,365,133 B2
(45) Date of Patent: Jul. 30, 2019

(54) SENSOR SYSTEM

(71) Applicant: OMRON Corporation, Kyoto (JP)

(72) Inventors: Hiroyuki Mino, Osaka (JP); Naotsugu Ueda, Shiga (JP); Yoshitaka Tsurukame, Shiga (JP)

(73) Assignee: Omron Corporation, Kyoto (JP)

( * ) Notice: Subject to any disclaimer, the term of this patent is extended or adjusted under 35 U.S.C. 154(b) by 197 days.

(21) Appl. No.: 15/509,378

(22) PCT Filed: Feb. 26, 2016

(86) PCT No.: PCT/JP2016/055759
§ 371 (c)(1),
(2) Date: Mar. 7, 2017

(87) PCT Pub. No.: WO2016/143545
PCT Pub. Date: Sep. 15, 2016

(65) Prior Publication Data
US 2017/0284840 A1    Oct. 5, 2017

(30) Foreign Application Priority Data

Mar. 11, 2015  (JP) ................................. 2015-048747

(51) Int. Cl.
*G01D 21/02* (2006.01)
(52) U.S. Cl.
CPC .................... *G01D 21/02* (2013.01)
(58) Field of Classification Search
CPC ................ G01D 21/02; G01D 2/02
See application file for complete search history.

(56) References Cited

U.S. PATENT DOCUMENTS

2004/0243358 A1    12/2004    Schliep et al.
2005/0275528 A1    12/2005    Kates
(Continued)

FOREIGN PATENT DOCUMENTS

CN    101321180 A    12/2008
CN    101621436 A    1/2010
(Continued)

OTHER PUBLICATIONS

International Search Report issued in PCT/JP2016/055759, dated May 31, 2016 (2 pages).
(Continued)

*Primary Examiner* — Robert R Raevis
(74) *Attorney, Agent, or Firm* — Osha Liang LLP

(57) ABSTRACT

A sensor system has a plurality of sensors and is capable of measuring a plurality of physical quantities. The sensor system includes an operation setting section configured to set operations of the plurality of sensors and an event determining section configured to determine that a prescribed event has occurred when output values of at least a part of the sensors among the plurality of sensors satisfy event conditions corresponding to an occurrence of the prescribed event. When the event determining section determines that the prescribed event has occurred, the operation setting section is configured to change an operational state of a sensor which, among the plurality of sensors, is required to determine an occurrence of an associated event, which is an event that may occur in association with the occurrence of the prescribed event.

7 Claims, 15 Drawing Sheets

(56) References Cited

U.S. PATENT DOCUMENTS

2006/0102731 A1    5/2006   Mueller et al.
2008/0307075 A1   12/2008   Urano et al.
2011/0248846 A1   10/2011   Belov et al.
2017/0038819 A1*   2/2017   Kabasawa .............. G01C 17/28

FOREIGN PATENT DOCUMENTS

| JP | 2005-013057 A | 1/2005 |
| JP | 2005-504268 A | 2/2005 |
| JP | 2005-135057 A | 5/2005 |
| JP | 2006-170751 A | 6/2006 |
| JP | 2010-256193 A | 11/2010 |
| JP | 2012-239137 A | 12/2012 |
| JP | 2013-054518 A | 3/2013 |
| JP | 2014-173745 A | 9/2014 |

OTHER PUBLICATIONS

Written Opinion of the International Searching Authority issued in PCT/JP2016/055759, dated May 31, 2016 (4 pages).
International Preliminary Report on Patentability for corresponding International Application No. PCT/JP2016/055759, dated Sep. 12, 2017 (6 pages).
Office Action issued in Chinese Application No. 201680002586.2, dated Aug. 20, 2018 (21 pages).

\* cited by examiner

FIG. 7

| TRANSITION PATTERN | EVENT 1 | | EVENT 2 | | EVENT 3 | |
|---|---|---|---|---|---|---|
| A | SENSOR 1A SENSOR 1C | EVENT CONDITIONS (a) | SENSOR 1A SENSOR 1B | EVENT CONDITIONS (b) | SENSOR 1A SENSOR 1D | EVENT CONDITIONS (d) |
| B | | | SENSOR 1C SENSOR 1B | EVENT CONDITIONS (c) | SENSOR 1C SENSOR 1E | EVENT CONDITIONS (e) |
| C | | | | | | |

SENSOR SYSTEM

TECHNICAL FIELD

The present invention relates to a sensor system for detecting an occurrence of an event.

BACKGROUND ART

A wide variety of sensors are being developed as sensors for detecting physical quantities such as temperature, humidity, air pressure, and light intensity. Particularly, in recent years, sensors referred to as MEMS (Micro Electro Mechanical Systems) with small sizes and low power consumption (hereinafter, also referred to as MEMS sensors) are attracting attention. Since a MEMS sensor with a small size and low power consumption can be readily provided in plurality, sensor units equipped with a wide variety of sensors can be constructed.

Such a sensor unit is capable of compositely sensing an environment such as a work space or a residential space and acquiring various types of information exemplified by information related to energy such as power, biometric information, and environmental information. In addition, through such information, the sensor unit is able to supporting diversified information analysis and utilization.

With a sensor unit including a plurality of sensors as described above, even when power consumption of each individual sensor is low, high power consumption of the unit as a whole may become an issue. In particular, when a battery is adopted as a power supply due to constraints on installation and the like, power consumption is desirably minimized. For example, once a sensor unit is installed and collection, accumulation, and transmission of environmental data commence, since the sensor unit is desirably driven for as long a period as possible without having to replace the battery, power consumption must be kept low. When power consumption cannot be kept low and a frequency of battery replacement is high, maintenance costs for replacing batteries are incurred. The incurrence of such maintenance costs poses a barrier to introduction of sensors.

PTL 1 proposes a system which varies sleep time of a wireless sensor in accordance with an operational state of equipment (air conditioning). In the system proposed in PTL 1, battery consumption is suppressed by setting a short sleep time of the sensor when the equipment (air conditioning) is operational and setting a long sleep time of the sensor when the equipment (air conditioning) is not operational.

PTL 2 proposes a wireless management system which awakes a control section in a sleep state when a time of day set in advance arrives to transmit acquired data and receive commands addressed to the system's own apparatus and which makes a transition to a sleep state when receiving a sleep command addressed to the system's own apparatus. Accordingly, even when a plurality of systems are arranged at scattered outdoor locations, the systems can be stably operated with batteries over a long period of time.

PTL 3 proposes a wireless distance detection system which includes a power saving mode in which an inquiry is made once every minute and an attention-required mode in which the inquiry is made six times per minute, and when motion of a mobile terminal is detected by an acceleration sensor, intervals at which inquiries are made are shortened.

As described above, conventional systems are designed to save power by controlling sensors to either operate or sleep in accordance with specific conditions. However, depending on situations, power saving cannot be appropriately achieved by controlling sensors in accordance with specific conditions. In particular, when performing composite sensing using a plurality of sensors, it is difficult to appropriately control all of the sensors under a single condition.

CITATION LIST

Patent Literature

[PTL 1] Japanese Patent Application Laid-open No. 2014-173745
[PTL 2] Japanese Patent Application Laid-open No. 2012-239137
[PTL 3] Japanese Patent Application Laid-open No. 2013-54518
[PTL 4] US Patent Application Publication No. 2006/102731 (Specification)
[PTL 5] US Patent Application Publication No. 2005/275528 (Specification)
[PTL 6] US Patent Application Publication No. 2011/248846 (Specification)

SUMMARY OF INVENTION

Technical Problem

The present invention has been made in consideration of the conventional art described above and an object thereof is to provide a technique which enables power saving to be achieved by determining an occurrence of an event based on detection values of sensors and setting an operating parameter of each sensor in accordance with a determined event to cause each sensor to operate appropriately in an autonomous manner in accordance with a state of occurrence of the event.

Solution to Problem

The present invention for solving the problems described above determines an occurrence of a prescribed event when output values of at least a part of sensors among a plurality of sensors satisfy event conditions corresponding to the occurrence of the prescribed event, and sets an operating parameter of a sensor required to determine an occurrence of an associated event which is an event that may occur in association with the occurrence of the prescribed event to a value more advantageous for determining the occurrence of the associated event.

More specifically, the present invention provides a sensor system which has a plurality of sensors and which is capable of measuring a plurality of physical quantities, the sensor system including: operation setting section configured to set operating parameters of the plurality of sensors; and event determining section configured to determine that a prescribed event has occurred when output values of at least a part of sensors among the plurality of sensors satisfy event conditions corresponding to an occurrence of the prescribed event, wherein when the occurrence of the prescribed event is determined by the event determining section, the operation setting section changes an operational state of a sensor which, among the plurality of sensors, is required to determine an occurrence of an associated event which is an event that may occur in association with the occurrence of the prescribed event.

Accordingly, an operating parameter in accordance with an occurred event can be set and a sensor can implement an operation required to determine an occurrence of an associated event that may occur in association with the occurrence of the event. In other words, even when a plurality of sensors are provided, by setting required sensors to operate and non-required sensors not to operate in accordance with a state of occurrence of an event, power savings can be achieved.

In addition, in the present invention, the event determining section may determine an occurrence of the associated event when output values of sensors including a sensor required to determine the occurrence of the associated event among the plurality of sensors satisfy associated event conditions corresponding to the occurrence of the associated event.

Furthermore, the present invention may include transmitting section for transmitting output values of the sensors to a receiving apparatus which is externally provided, wherein changing an operational state of a sensor which is required to determine an occurrence of the associated event may involve setting a resolution of the sensor, sampling intervals of data by the sensor, or transmission intervals of an output value from the sensor, to a value more advantageous for determining the occurrence of the associated event, and when the event determining section determines that the prescribed event has occurred, the operation setting section may be configured to change to settings which cause resolution of the sensor required to determine the occurrence of the associated event to be increased, cause the sampling intervals of data by the sensor to be shortened, or cause the transmission intervals of an output value from the sensor to be shortened.

In addition, in the present invention, before the event determining section determines an occurrence of the prescribed event, the operation setting section may set at least one of a resolution of a sensor which is required to determine an occurrence of the associated event, sampling intervals of data by the sensor, or communication intervals of wireless communication from the sensor, to a power saving mode in which power consumption is as low as possible. In other words, the operation setting section is configured to, after a determination is made that the prescribed event has occurred, increase a resolution of a sensor which is required to determine an occurrence of the associated event, shorten sampling intervals of data by the sensor, or shorten transmission intervals of an output value from the sensor, and before the occurrence of the prescribed event is determined, implement setting to a power saving mode which lowers power consumption as much as possible by preventing these operations from being performed. In other words, until a prescribed event occurs and a determination of an occurrence of the associated event is required, operating parameters with respect to a resolution, sampling intervals, and transmission intervals of each sensor are set such that power consumption is as low as possible.

Furthermore, in the present invention, the associated event conditions may be changed in accordance with, when output values of at least a part of sensors among the plurality of sensors satisfy event conditions corresponding to an occurrence of a prescribed event, an output value of at least one sensor among the plurality of sensors. By setting conditions for determining an occurrence of an associated event using an output value of a sensor which satisfies event conditions of a prescribed event as described above, an appropriate value in accordance with a state of occurrence of an event can be used as conditions for determining the occurrence of the associated event and an appropriate determination can be made.

In addition, in the present invention, when the event determining section determines an occurrence of the associated event, the operation setting section may set an operating parameter of a sensor that, among the plurality of the sensors, is required to determine an occurrence of a second associated event, which is an event that may occur in further association with the occurrence of the associated event, to a value more advantageous for determining the occurrence of the second associated event, and the event determining section may determine the occurrence of the second associated event when output values of sensors including a sensor required to determine the occurrence of the second associated event among the plurality of sensors satisfy second associated event conditions corresponding to the occurrence of the second associated event, and repetitively perform a similar process on an event further associated with the second associated event.

Furthermore, in the present invention, the sensor system may be a composite sensor unit in which the plurality of sensors that detect different physical quantities are arranged inside a single package.

In addition, in the present invention, each of the plurality of sensors may be a composite sensor unit in which a plurality of sensors that detect different physical quantities are arranged inside a single package, and the sensor system may be constituted by a plurality of composite sensor units arranged in a prescribed area.

Moreover, means for solving the problems described above can be used in every possible combination thereof.

Advantageous Effects of Invention

According to the present invention, power savings can be achieved by causing each sensor of a sensor system to operate appropriately in an autonomous manner in accordance with a state of occurrence of an event.

BRIEF DESCRIPTION OF DRAWINGS

FIG. 7 is a diagram for explaining a transition of operating parameters set by an operation setting section in accordance with a determined event.

DESCRIPTION OF EMBODIMENTS

A mode for implementing the present invention will now be exemplarily described in detail with reference to the drawings.

Figure 1:
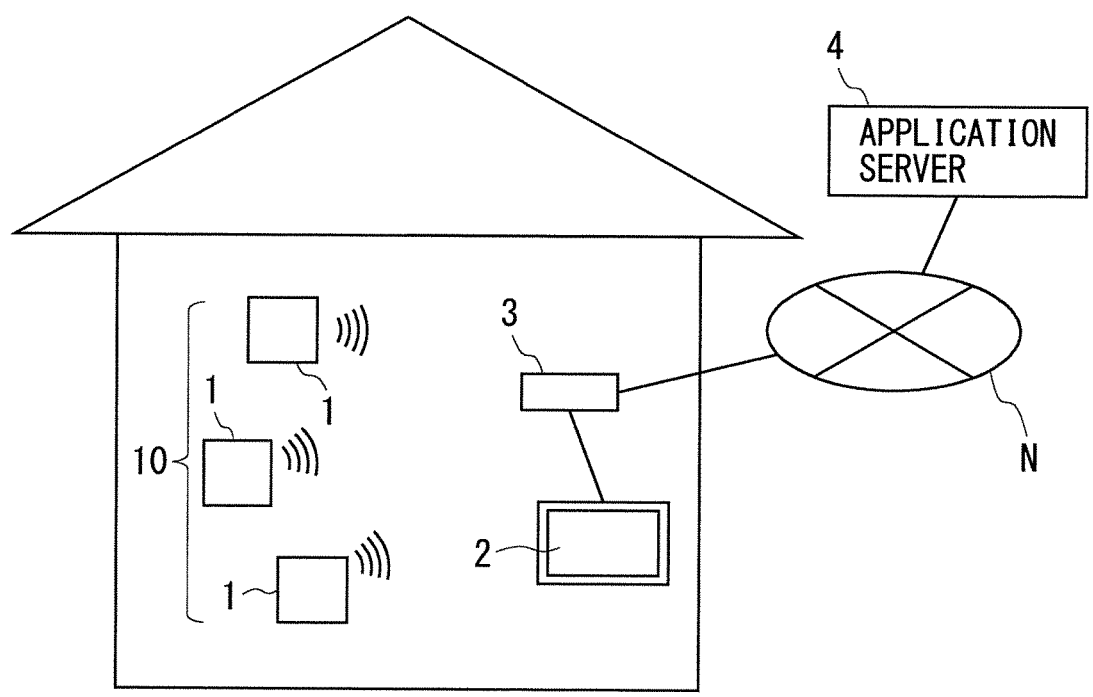
FIG. 1 is a diagram showing an installation example of a sensor system according to an embodiment of the present invention.

FIG. 1 is a diagram showing an installation example of a sensor system 10 according to the present embodiment. In the present embodiment, a plurality of composite sensor units 1 are provided in a user's residence and the sensor system 10 is constituted by the plurality of composite sensor units 1. Moreover, the sensor system 10 is not limited to a sensor system constituted by a plurality of composite sensor units 1 and may be constituted by a single composite sensor unit 1. In addition, a user terminal 2 and a gateway 3 are provided in the user's residence. The sensor system 10 sends detected data to the gateway 3 and the gateway 3 transmits the data to an application server 4 via a network N such as the Internet. In addition, the application server 4 processes received data and outputs a processing result. For example, the processing result is transmitted to the user terminal 2 via the network N.

Figure 2:
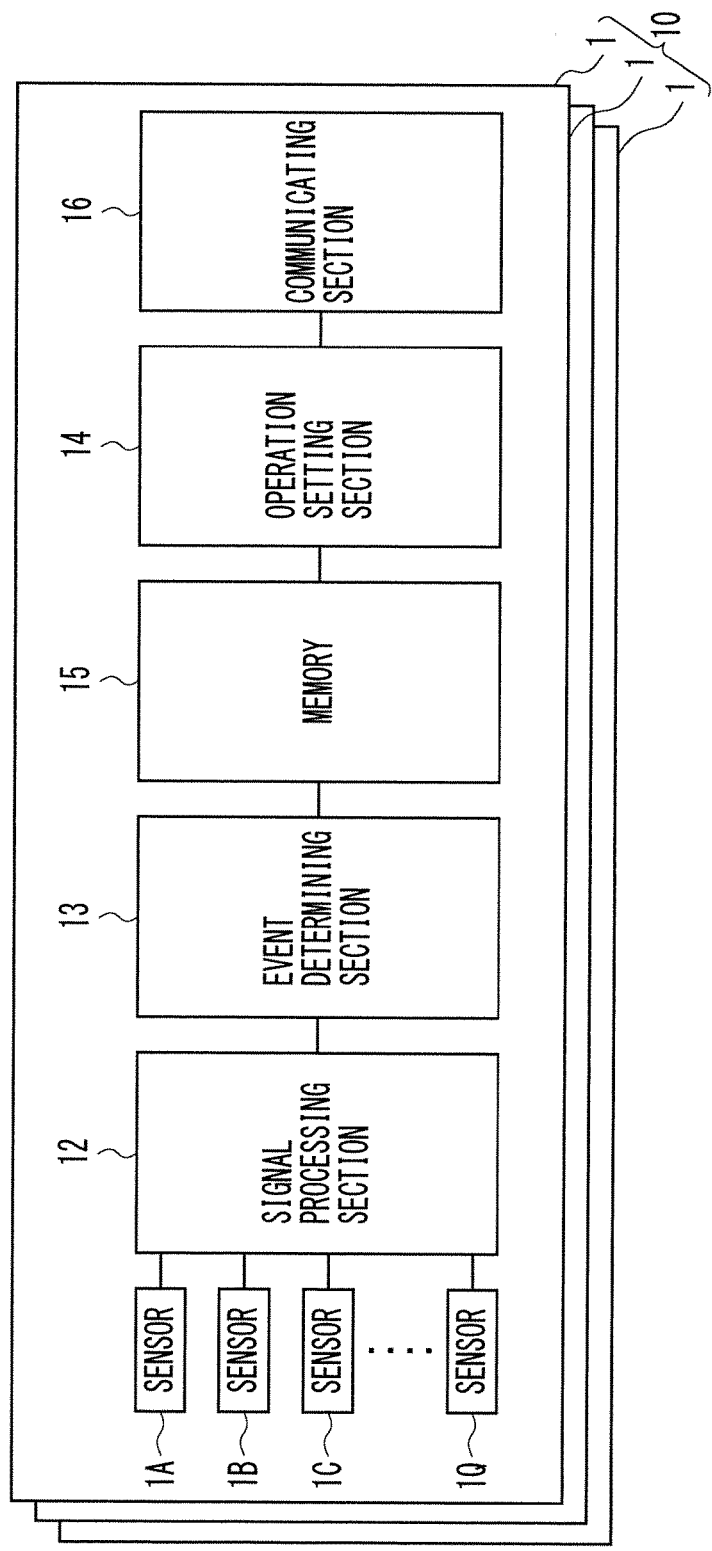
FIG. 2 is a diagram showing a schematic configuration of a sensor system.

FIG. 2 is a diagram showing a schematic configuration of the sensor system 10. The sensor system 10 includes a plurality of the composite sensor units 1, and each composite sensor unit 1 includes a plurality of sensors 1A to 1Q, a signal processing section 12, an event determining section 13, an operation setting section 14, a memory 15, and a communicating section 16 in a single package. Moreover, FIG. 2 represents an example in which the sensor system 10 is constituted by a plurality of the composite sensor units 1. When the sensor system 10 is constituted by a single composite sensor unit 1, the single composite sensor unit 1 corresponds to the sensor system 10.

Each of the plurality of sensors 1A to 1Q is a sensor which measures a physical quantity of a measurement object. The signal processing section 12 performs signal processing such as obtaining an average value, a maximum value, or a minimum value on output values of the sensors 1A to 1Q.

The event determining section 13 determines that a prescribed event has occurred when output values of at least a part of sensors among the plurality of sensors 1A to 1Q satisfy event conditions corresponding to an occurrence of the prescribed event. In addition, the event determining section 13 determines that an associated event which is an event that may occur in association with the occurrence of the prescribed event has occurred when output values of sensors including a sensor required to determine an occurrence of the associated event among the plurality of sensors 1A to 1Q satisfy associated event conditions corresponding to the occurrence of the associated event.

Furthermore, the event determining section 13 determines that a second associated event which is an event that may occur in association with an occurrence of the associated event has occurred when output values of sensors including a sensor required to determine an occurrence of the second associated event among the plurality of sensors 1A to 1Q satisfy second associated event conditions corresponding to the occurrence of the second associated event. In a similar manner, the event determining section 13 determines that an N+1-th associated event which is an event that may occur in association with an occurrence of an N-th associated event has occurred when output values of sensors including a sensor required to determine an occurrence of the N+1-th associated event among the plurality of sensors 1A to 1Q satisfy N+1-th associated event conditions corresponding to the occurrence of the N+1-th associated event. Moreover, in the present embodiment, when describing matters shared by an event, an associated event, an N-th associated event, and an N+1-th associated event, the events may be simply referred to as an event. In addition, while only one event determining section 13 is described in the present embodiment, the event determining section 13 may be provided in plurality in the sensor unit 1 or the sensor system 10. For example, a part of an event, an associated event, and a second associated event may respectively be determined by different event determining sections 13.

The operation setting section 14 is an example of operation setting means configured to set operations of each of the plurality of sensors 1A to 1Q by setting operating parameters of the plurality of sensors 1A to 1Q in accordance with a state of an occurrence of an event. When the event determining section 13 determines that a prescribed event has occurred, the operation setting section 14 sets an operating parameter of a sensor required to determine an occurrence of an associated event which is an event that may occur in association with the occurrence of the prescribed event among the plurality of sensors 1A to 1Q to a value more advantageous for determining the occurrence of the associated event in order to place each of the sensors 1A to 1Q in an operational state more advantageous for determining the occurrence of the associated event. For example, when the event determining section 13 determines that a prescribed event has occurred, the operation setting section 14 sets operations of each of the sensors 1A to 1Q so as to increase a resolution of a sensor which is required to determine an occurrence of the associated event, shorten the sampling intervals of data by the sensor, or shorten the transmission intervals of an output value from the sensor. In addition, the event determining section 13 determines that an associated event has occurred when output values of sensors including a sensor required to determine an occurrence of the associated event among the plurality of sensors 1A to 1Q satisfy associated event conditions corresponding to the occurrence of the associated event.

The memory 15 is storage means configured to store output values of the sensors 1A to 1Q, event conditions, operation settings of the sensors 1A to 1Q and the communicating section 16, and the like. The memory 15 may be a volatile memory such as a DRAM, a nonvolatile memory such as a flash memory, or a combination of a volatile memory and a nonvolatile memory.

The communicating section 16 is an example of transmitting means configured to communicate with an external receiving apparatus such as the gateway 3, the application server 4, and other composite sensor units 1 and transmit output values of the sensors 1A to 1Q to the receiving apparatus. For example, the communicating section 16 communicates with the application server 4 via the gateway 3 and transmits output values of the sensors 1A to 1Q. Alternatively, instead of communicating with the application server 4, the communicating section 16 may communicate with the gateway 3 to transmit output values of the sensors to the gateway 3, and the gateway 3 may transmit output values of the sensors to the application server 4. In addition, while the communication between the communicating section 16 and the gateway 3 and the communication between the communicating section 16 and other composite sensor units 1 may be either wired communication or wireless communication, wireless communication is desirable. At least a part of the sensors 1A to 1Q is capable of transmitting an output value to the external receiving apparatus via the communicating section 16. In this case, each of the sensors 1A to 1Q may communicate with the receiving apparatus or the communicating section 16 may transmit an output value stored in the memory 15 or the like by each of the sensors 1A to 1Q to the receiving apparatus. Moreover, the sensor system 10 need only be capable of transmitting at least output values of the sensors 1A to 1Q and may be configured to include a transmitting section which only performs transmission in place of the communicating section 16.

Figure 3:
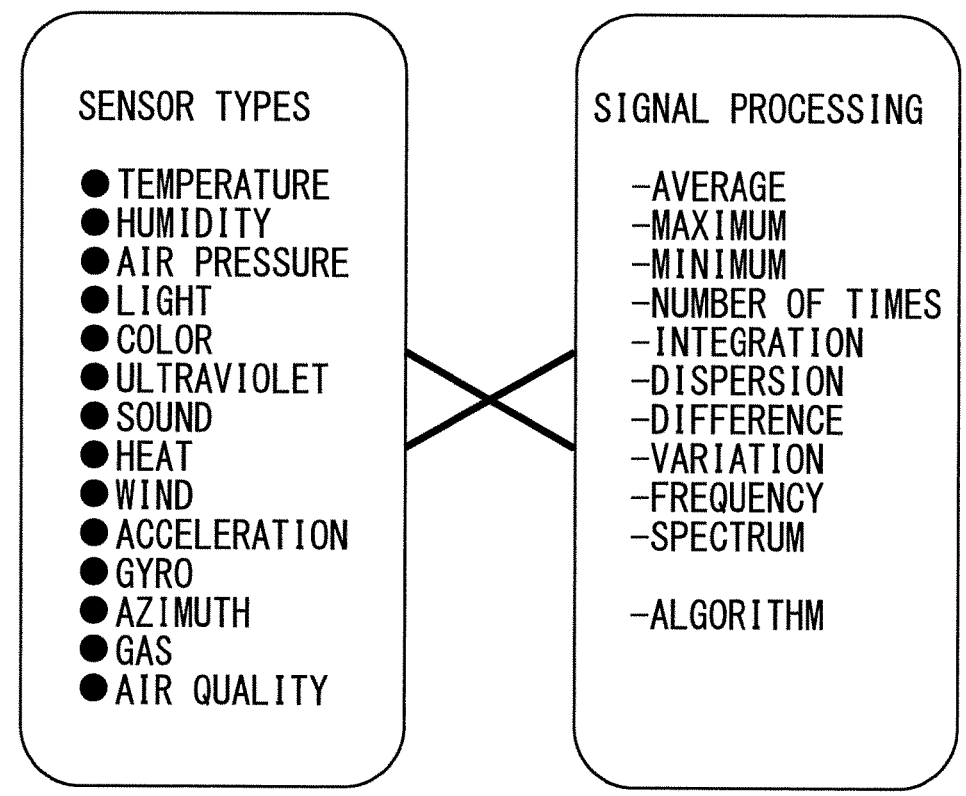
FIG. 3 is a diagram showing examples of sensor types and signal processing.

FIG. 3 is a diagram showing examples of types of the sensors 1A to 1Q and signal processing by the signal processing section 12. As shown in FIG. 3, examples of the sensors 1A to 1Q include a temperature sensor, a humidity sensor, an absolute pressure sensor, a light sensor, a color sensor (an RGB sensor), an ultraviolet sensor, a sound sensor (a microphone), a heat sensor, a wind sensor (a flow sensor), an acceleration sensor, a gyroscope (a gyro sensor), an azimuth sensor, a gas sensor, an air quality sensor, a $CO_2$ sensor, a position sensor, a distortion sensor, an infrared sensor, a magnetic sensor, and a luminance sensor. Moreover, the sensors 1A to 1Q are not limited to these examples and may be other sensors. In addition, examples of signal processing include obtaining, with respect to output values measured and output in a prescribed period by the sensors 1A to 1Q, an average value, a maximum value, a minimum value, the number of times, an integrated value, a dispersion, a difference, a variation, a frequency, and a spectrum. Alternatively, the signal processing section 12 may perform a process of subjecting output values of the sensors 1A to 1Q to an arithmetic operation using a prescribed algorithm and obtaining an operation result.

Figure 4:
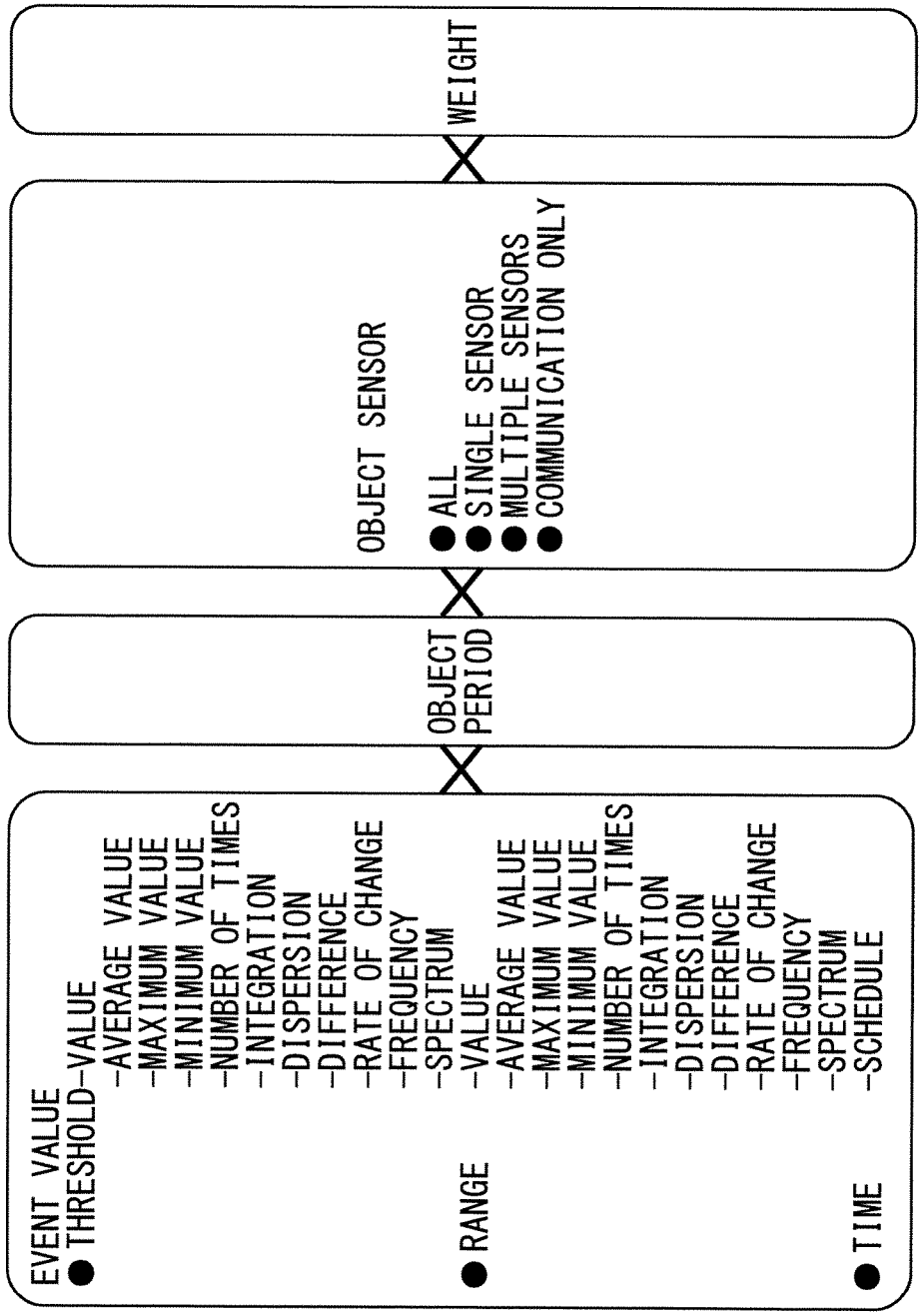
FIG. 4 is an explanatory diagram of event conditions.

FIG. 4 is an explanatory diagram of event conditions. The event determining section 13 determines that event conditions are satisfied or, in other words, an event has occurred when an output value of an object sensor corresponds to an event value within an object period. The event conditions may be set in plurality, in which case each of the event conditions may be weighted.

In FIG. 4, an event value refers to a threshold, a range, or time (schedule) for determining an occurrence of an event. The threshold may be an output value itself of a sensor determining that an event has occurred or a value for specifying an average value, a maximum value, a minimum value, the number of outputs, an integrated value, a dispersion, a difference, a rate of change, a frequency, or a spectrum. A determination that an event has occurred is made when an output value of an object sensor among the sensors 1A to 1Q exceeds or falls below the threshold. In a similar manner, the range is an output value itself of a sensor determining that an event has occurred or a value for specifying an average value, a maximum value, a minimum value, the number of outputs, an integrated value, a dispersion, a difference, a rate of change, a frequency, or a spectrum. A determination that an event has occurred is made when an output value of an object sensor among the sensors 1A to 1Q is within or outside of the range.

In addition, when an event occurrence time of day (schedule) is set as an event value, it is determined that an event has occurred at the set time of day regardless of the output values of the sensors 1A to 1Q.

An object period refers to a period in which output values of the sensors 1A to 1Q are acquired in order to determine an occurrence of an event such as a prescribed cycle or a prescribed time or day or, in other words, a period in which measurements are to be performed by the sensors 1A to 1Q.

An object sensor refers to a sensor of which an output value is used in order to determine an occurrence of an event or, in other words, a sensor required to determine the occurrence of the event among the sensors 1A to 1Q. A single sensor or a plurality of sensors can be set as the object sensor. In addition, when a plurality of sensors are set as object sensors, whether to determine that an event has occurred when output values of all object sensors correspond to an event value or to determine that the event has occurred when an output value of any of the object sensors corresponds to the event value may be specified. Alternatively, the communicating section 16 may be considered one of the sensors, the communicating section 16 may be designated as an object sensor, and communication quality or the number of communication sessions may be used as an event value.

A weight refers to a coefficient for specifying a priority of a plurality of event conditions. For example, an event with a larger weight coefficient may be given a higher priority.

Figure 5:
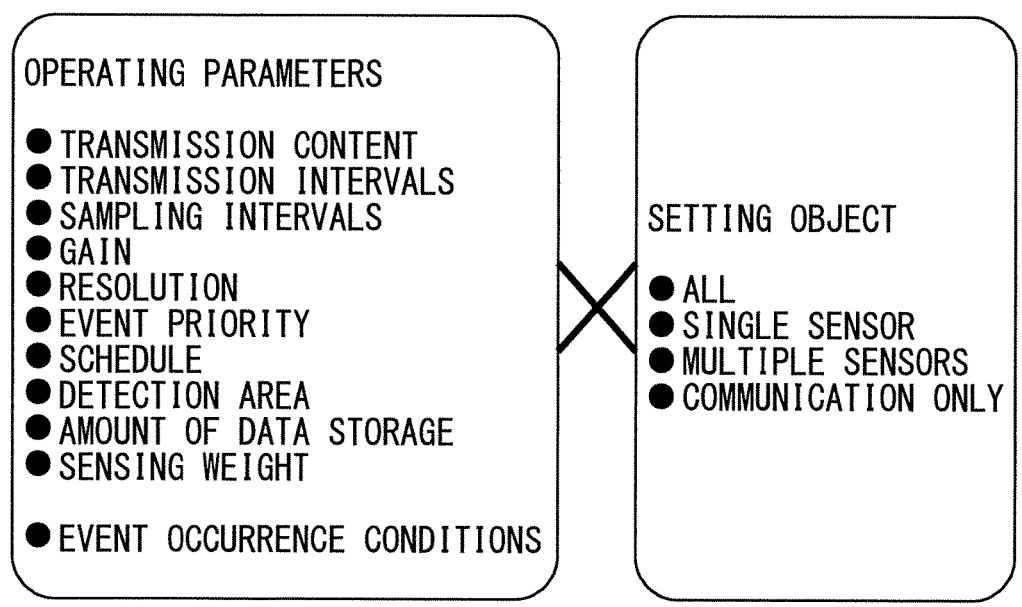
FIG. 5 is an explanatory diagram of operation settings by an operation setting section.

FIG. 5 is an explanatory diagram of operation settings by the operation setting section 14. The operation setting section 14 changes operating parameters which determine operations of the sensors 1A to 1Q and the communicating section 16 and setting objects for which the operating parameter are to be set in accordance with an event determined by the event determining section 13.

As shown in FIG. 5, for example, as operating parameters, the operation setting section 14 sets a transmission content, transmission intervals, sampling intervals, a gain, a resolution, an event priority, a schedule, a detection area, an amount of data storage, a sensing weight, and event conditions.

In the operation settings shown in FIG. 5, the transmission content is a parameter indicating information to be transmitted such as which sensor's output value is to be transmitted, which value among an average value, a maximum value, a dispersion, and the like of a sensor is to be transmitted, whether or not information indicating current event conditions, operation settings, a state of occurrence of an event, and the like is to be transmitted, and the like.

The transmission intervals are a parameter indicating intervals at which wireless communication is performed in the case of the communicating section 16 and intervals at which output values are output in the case of each of the sensors 1A to 1Q.

The sampling intervals are a parameter indicating intervals at which the sensors 1A to 1Q perform measurements.

The gain is a parameter for setting sensitivity of the sensors 1A to 1Q. Controlling the gain enables output values in a prescribed range to be acquired. The resolution is a parameter for setting accuracy of values to be measured by the sensors 1A to 1Q. For example, a low resolution is set in normal times and a high resolution is set during an emergency such as when an earthquake occurs so that even minute changes can be measured. In addition, a small gain is set when a range to be measured by a sensor is wide and a large gain is set when the range to be measured by the sensor is narrow. For example, a large gain is set in normal times to enable detection from 20° C. to 60° C. and a small gain is set during an emergency such as when a fire occurs to enable detection from 0° C. to 100° C.

The event priority is a parameter for setting a priority of event conditions. For example, a weight of event conditions is set based on an event priority.

The schedule is a parameter for designating an event occurrence time of day when an occurrence of an event is to be determined at a designated time of day.

The detection area is a parameter for setting an area to be detected by a sensor which includes a detection area such as a visual field range of an infrared sensor or the like and which allows the area to be adjusted, for example.

The amount of data storage is a parameter for setting an amount of storage when causing the memory 15 to store output values of the sensors 1A to 1Q.

The sensing weight is a parameter for setting a coefficient when calculating another value based on a plurality of sensed values. For example, when obtaining comfortability P from temperature T and humidity H with a mathematical expression $P=a \cdot T + b \cdot H$, the coefficients a and b are sensing weights.

In addition, event conditions are a parameter for determining an event value, an object period, an object sensor, and a weight used by the event determining section 13 in order to determine an occurrence of an event.

In addition to the above, the operating parameters may be parameters used by the communicating section 16 to determine a cycle, a time of day, or transmission conditions with respect to transmitting the output values of the sensors 1A to 1Q. Moreover, for example, transmission conditions indicate conditions for transmitting or not transmitting such as not transmitting when output values of the sensors 1A to 1Q are identical to values stored in the memory 15 and transmitting when the output values differ from the values stored in the memory 15.

Furthermore, the setting object is information indicating the sensors 1A to 1Q or the communicating section 16 for which the operating parameters are to be set. A single sensor or a plurality of sensors, all of the sensors, or the communicating section 16 can be set as the setting object.

Figure 6:
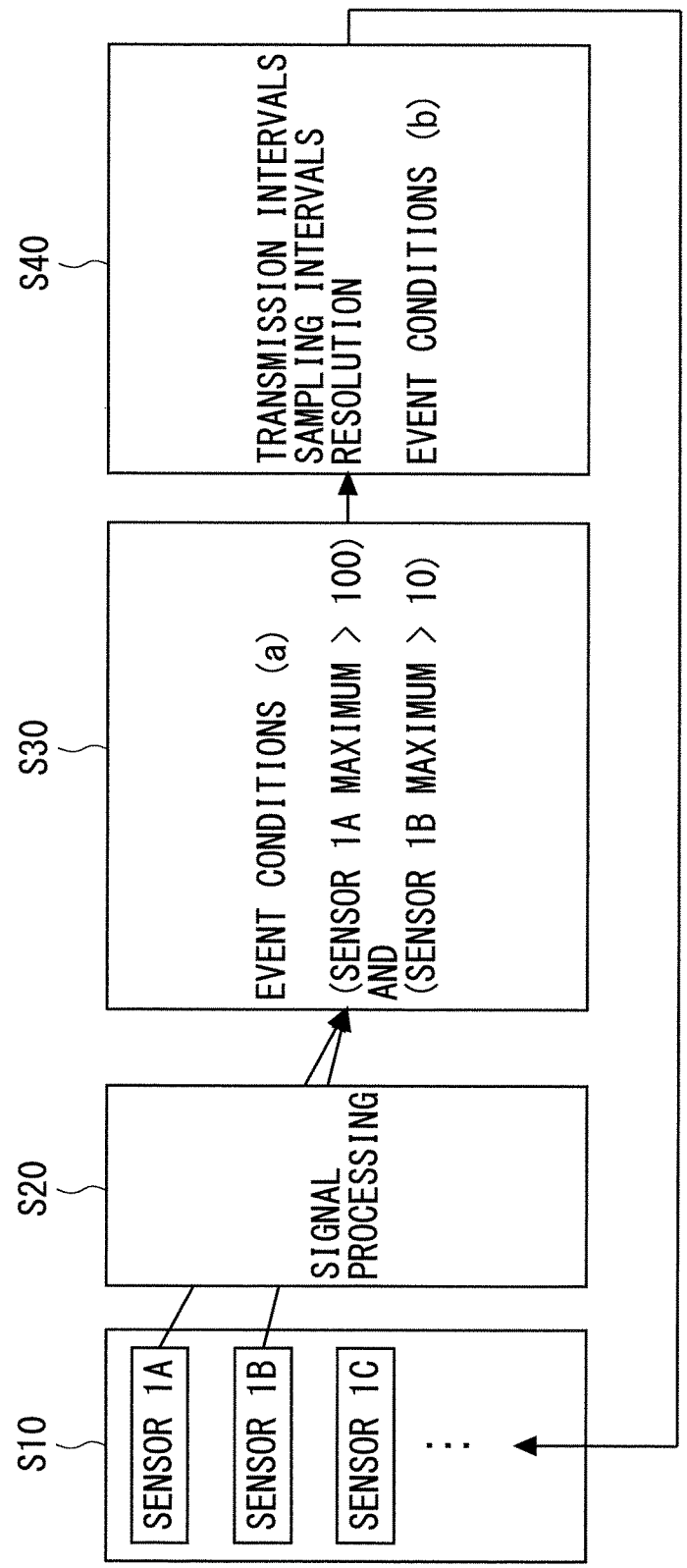
FIG. 6 is a diagram showing a flow of operations of respective sections of a sensor system.

FIG. 6 is a diagram showing a flow of operations of respective sections of the sensor system 10. First, the respective sensors 1A to 1Q refer to operating parameters set in the memory 15 and perform measurements at sampling intervals, a gain, a resolution, and the like in accordance with the operating parameters (S10).

Next, the signal processing section 12 applies signal processing on output values of the sensors in accordance with transmission contents of the operating parameters and obtains a value to be transmitted such as an average value, a maximum value, or dispersion (S20).

The event determining section 13 determines whether or not the output values of the sensors 1A to 1Q before signal processing or the output values after signal processing satisfy event conditions set as an operating parameter, determines an occurrence of an event when the event conditions are satisfied, and notifies the operation setting section 14 of the determined event and output values of the sensors 1A to 1Q (S30).

The operation setting section 14 notified of the occurrence of the event changes an operating parameter of a sensor required to determine an occurrence of an associated event which is an event that may occur in association with the occurred event to a value more advantageous for determining the occurrence of the associated event (S40). Moreover, in a state where output values of the sensors 1A to 1Q do not satisfy the event conditions and the event determining section 13 has not determined an event, since changes to the operating parameter are not made by the operation setting section 14, operations in accordance with a last set operating parameter is maintained.

By repetitively performing respective operations S10 to S40 by the sensors 1A to 1Q, the signal processing section 12, the event determining section 13, and the operation setting section 14, the sensors 1A to 1Q can be appropriately operated in accordance with a state of occurrence of an event.

FIG. 7 is a diagram for explaining a transition of operating parameters set by the operation setting section 14 in accordance with a determined event. As shown in FIG. 7, in a state where an event 1 is determined in a transition pattern A, an operating parameter is set so that the sensor 1A is operated and the event determining section 13 determines whether or not an output value of the sensor 1A satisfies a condition a. Moreover, in reality, a manner in which an object sensor is to be operated and event conditions are set in detail. However, FIG. 7 shows simplified settings for the sake of convenience. When output values of the sensors 1A and 1C satisfy event conditions (a), the event determining section 13 determines an occurrence of the event 1 and notifies the operation setting section 14 of the occurrence. The operation setting section 14 notified of the occurrence of the event 1 sets operating parameters so that the sensors 1A and 1B are operated and the event determining section 13 determines whether or not output values of the sensors 1A and 1B satisfy event conditions (b) and that the sensors 1B and 10 are operated and the event determining section 13 determines whether or not output values of the sensors 1B and 10 satisfy event conditions (c).

In addition, when output values of the sensors 1A and 1B satisfy event conditions (b) or when output values of the sensors 1B and 1C satisfy event conditions (c), the event determining section 13 determines an occurrence of an event 2 and notifies the operation setting section 14 of the occurrence. The operation setting section 14 notified of the occurrence of the event 2 sets operating parameters so that the sensors 1A and 1D are operated and the event determining section 13 determines whether or not output values of the sensors 1A and 1D satisfy event conditions (d) and that the sensors 1C and 1E are operated and the event determining section 13 determines whether or not output values of the sensors 1C and 1E satisfy event conditions (e). When output values of the sensors 1A and 1D satisfy event conditions (d) or when output values of the sensors 1C and 1E satisfy event conditions (e), the event determining section 13 determines an occurrence of an event 3 and notifies the operation setting section 14 of the occurrence.

When the occurrence of the event 1 is determined as described above, the operation setting section 14 sets an operating parameter for determining that the event 2 has occurred and, when it is determined that the event 2 has occurred, the operation setting section 14 sets an operating parameter for determining an occurrence of the event 3. In the example shown in FIG. 7, an associated event that may occur in association with the occurrence of the event 1 is the event 2, and a second associated event that may occur in association with the occurrence of the event 2 is the event 3. In other words, when it is determined that the event 1 has occurred, an operating parameter of a sensor required to determine an occurrence of the event 2 which is an associated event is changed to a value more advantageous for determining that the associated event 2 has occurred. In addition, the operating parameter set in order to determine the occurrence of the associated event 2 is a value which causes the respective sensors 1A to 1Q and the communicating section 16 to operate appropriately. Therefore, since operations necessary for determining the occurrence of the associated event 2 are performed and unnecessary operations are not performed, the operations of the respective sensors 1A to 1Q and the communicating section 16 in accordance with the operating parameter are operations which minimize power consumption.

In addition, the occurrence of the associated event 2 is determined when output values of sensors including a sensor required to determine the occurrence of the associated event 2 satisfy associated event conditions (b) and (c) which correspond to the occurrence of the associated event 2. Furthermore, in a similar manner to setting an operating parameter for determining an occurrence of a third associated event when the event determining section 13 determines that an associated event 3 (a second associated event) has occurred, the operation setting section 14 may repetitively perform an operation for setting an operating parameter for determining an occurrence of an N+1-th associated event when it is determined that an N-th associated event has occurred.

As shown in FIG. 7, an occurred event and an operating parameter to be set next are associated with each other in advance and stored as a transition pattern in the memory 15, and the operation setting section 14 sets an operating parameter of an associated event in accordance with the occurred event based on the transition pattern. Moreover, transitions of events are not limited to transitions determined in a fixed manner such as the event 2 following the event 1 and the event 3 following the event 2 and a configuration may be adopted in which transitions are made in accordance with satisfied conditions such as a transition to the event 3 being made when event conditions (b) of the event 2 are satisfied and a return to the event 1 being performed when event conditions (c) of the event 2 are satisfied.

Since an occurred event and an operating parameter to be set next are associated with each other in advance in this manner, in accordance with a state of an occurrence of an event, only the required sensors 1A to 1Q and the communicating section 16 are operated and sensors 1A to 1Q and the communicating section 16 not required to operate are placed in a non-operational state or, in other words, a state in which power is not consumed. This state in which power is not consumed will also be referred to as a power saving mode or a sleep mode. Alternatively, a configuration may be adopted in which, when entering the power saving mode or the sleep mode, instead of simply setting the sensors 1A to 1Q and the communicating section 16 in the power saving mode or the sleep mode not to operate, supply of power to the sensors 1A to 1Q and the communicating section 16 in the power saving mode or the sleep mode may be suspended or reduced.

Figure 8:
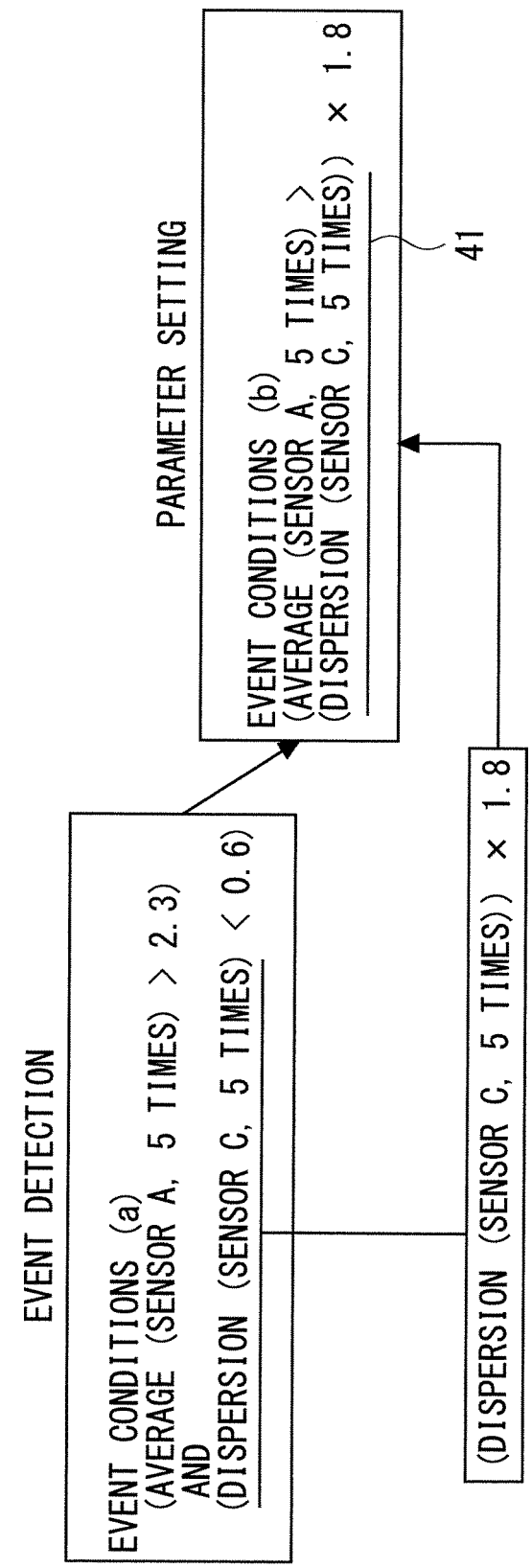
FIG. 8 is a diagram showing an example of using a variable in conditions for determining an occurrence of an associated event.

In addition, conditions for determining an occurrence of an associated event may be set in accordance with, when output values of at least a part of sensors among the sensors 1A to 1Q satisfy event conditions corresponding to an occurrence of a prescribed event, an output value of at least one sensor among the plurality of sensors. For example, conditions for determining an occurrence of an associated event may be set using a variable and a configuration may be adopted in which, when an occurrence of an event is first determined based on output values of the sensors 1A to 1Q, the output values of the sensors 1A to 1Q are substituted into a variable of conditions for determining a next associated event. FIG. 8 is a diagram showing an example of using a variable in conditions for determining an occurrence of an associated event. By setting conditions for determining an occurrence of an associated event using an output value of a sensor which satisfies event conditions of a prescribed event in this manner, an appropriate value in accordance with a state of occurrence of an event can be used as conditions for determining the occurrence of the associated event and an appropriate determination can be made.

In the example shown in FIG. 8, as event conditions (a), an average value of last five output values of the sensor 1A of 2.3 or more and a dispersion value of last five output values of the sensor 1C of 0.6 or less are set and an occurrence of the event 1 is determined when the event conditions (a) are satisfied. When the dispersion value is, for example, 0.5, the dispersion value 0.5 obtained from the event 1 is substituted into a variable 41 of event conditions (b) for determining a new associated event 2 to set the event conditions (b).

Figure 9:
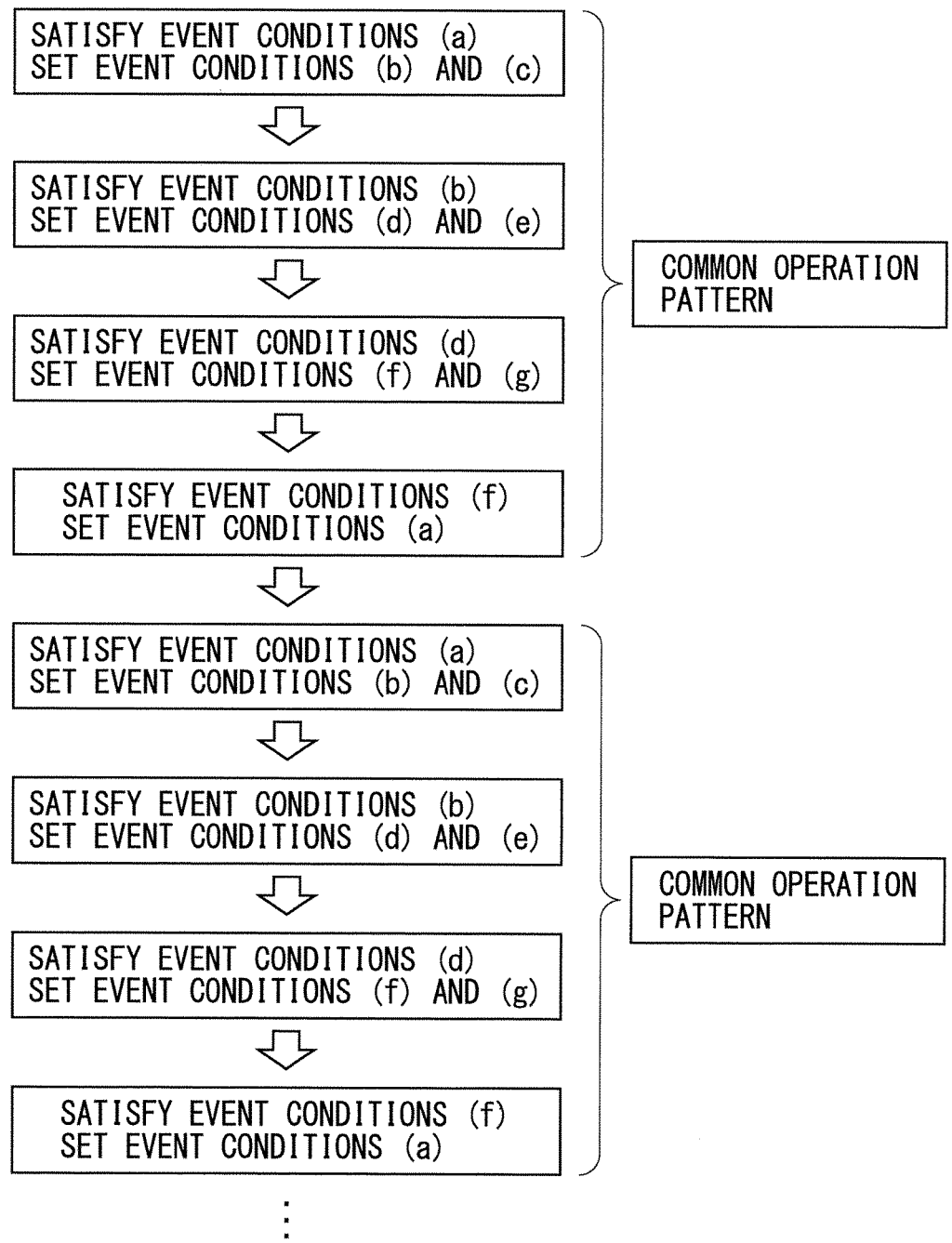
FIG. 9 is a diagram showing an example of event conditions which are repeated in accordance with a transition of events.

FIG. 9 is a diagram showing an example in which determinations of event conditions have been regularly repeated in accordance with a transition of events. Since an occurrence of an event is continually determined and event conditions are continually updated by operations S10 to S40 of the respective sections shown in FIG. 6, when events repetitively occur, settings and determination of event conditions are repeated as shown in FIG. 9. When setting of event conditions is regularly repeated as shown in FIG. 9, the operation setting section 14 may store in the memory 15 the repeated event conditions and timings (times of day or cycles) of the repetitions in the memory 15 as a common operation pattern and may set operating parameters in accordance with the common operation pattern. For example, when the event determining section 13 determines that the event conditions (a) are satisfied, the operation setting section 14 sets event conditions (b) and (c) in accordance with a transition pattern. Next, when the event determining section 13 determines that the event conditions (b) are satisfied, the operation setting section 14 sets event conditions (d) and (e). When the event determining section 13 determines that the event conditions (d) are satisfied, the operation setting section 14 sets event conditions (f) and (g). In addition, when the event determining section 13 determines that the event conditions (f) are satisfied, the operation setting section 14 sets event conditions (a) and, when the event determining section 13 determines that the event conditions (a) are satisfied, the operation setting section 14 sets event conditions (b) and (c) as described above.

In FIG. 9, the event conditions (a), (b), (d), and (f) are repetitively satisfied. When the number of repetitions equal or exceed a prescribed number of repetitions, the operation setting section 14 learns the series of operations by storing repeated event conditions and a time of day or time intervals at which each of the event conditions had been satisfied as a common operation pattern in the memory 15. In addition, after learning, when it is determined that first event conditions (a) in the common operation pattern have been satisfied, the operation setting section 14 sets an operating parameter of each sensor for determining the learned event conditions (b) instead of setting next event conditions (b) and (c). Furthermore, based on the learned common operation pattern, the operation setting section 14 sets an operating parameter of each sensor for determining next event conditions (d) at a time of day or time intervals at which the event conditions (b) had been satisfied. In a similar manner, the operation setting section 14 sets an operating parameter of each sensor for determining event conditions (f) based on the learned common operation pattern. When it is determined that the event conditions (f) are satisfied, the operation setting section 14 sets next event conditions (a) and an operating parameter of each sensor for determining the event conditions (a) and ends processing based on learning.

By learning a flow of a series of operations in this manner, setting of operating parameters can be made into a routine and operational efficiency can be improved. For example, since determinations by the event determining section 13 can be omitted, a processing load on the event determining section 13 can be reduced and, in turn, power consumption by the event determining section 13 can be reduced. Moreover, when event conditions (a) to (g) are repetitively set as described above, the event conditions (a) to (e) may be provisional conditions for determining final event conditions (f). In this case, when it is determined that first event conditions (a) have been satisfied, the operation setting section 14 may set an operating parameter of each sensor for determining the final event conditions (f). Accordingly, a further improvement in efficiency can be achieved by not setting operating parameters for determining the provisional event conditions (b) to (e) and (g).

First Specific Example

Figure 10:
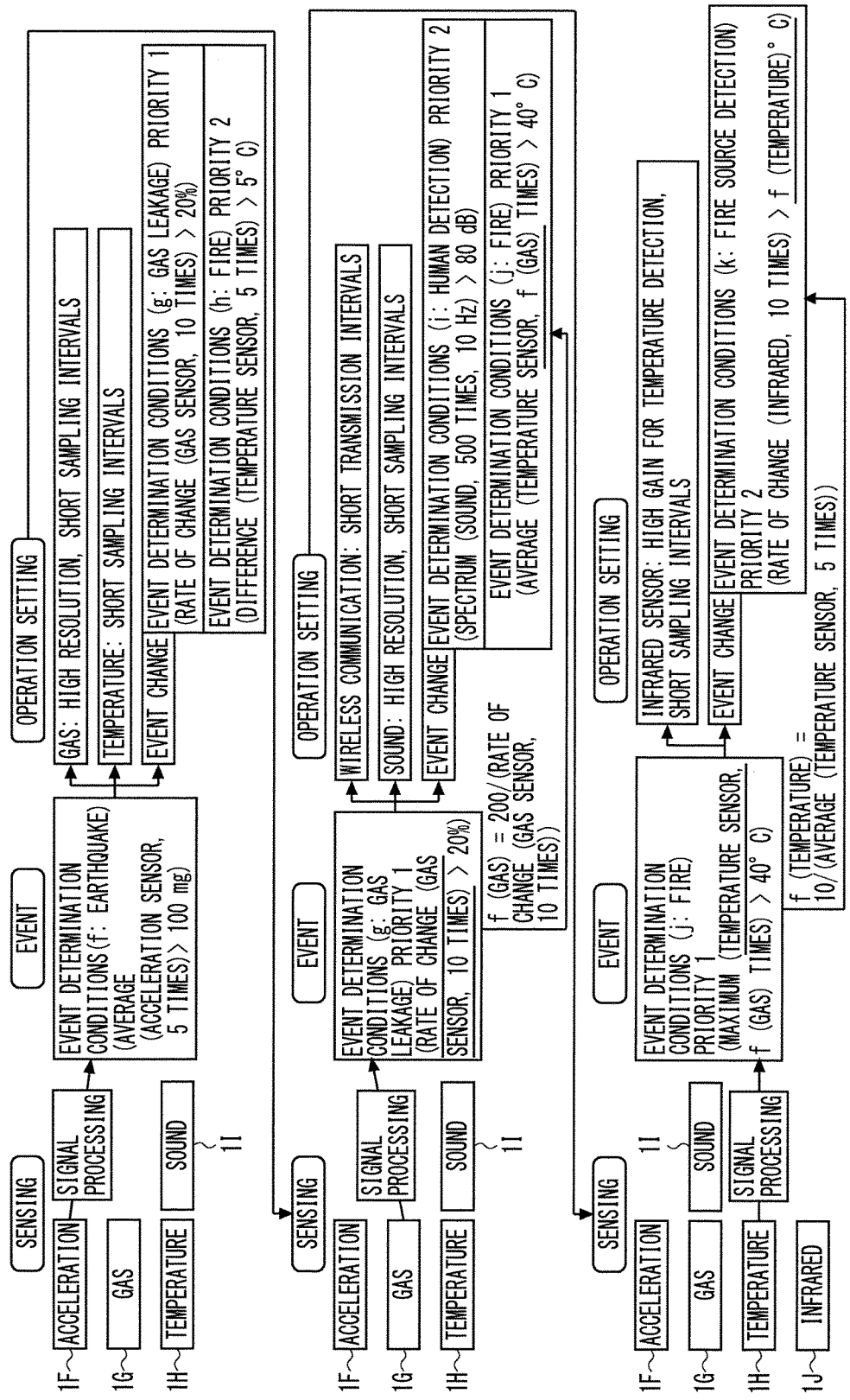
FIG. 10 is a diagram showing a first specific example of operations in a sensor system.

FIG. 10 is a diagram showing a first specific example of operations in the sensor system 10. The first specific example represents an example of operations during an occurrence of an earthquake by the composite sensor unit 1 provided in plurality in a user's residence. While the present first specific example represents an example of determining an earthquake event, a gas leakage event, a fire event, and the like as events, events are not limited to these specific phenomena. As described above, output values of at least a part of the sensors 1A to 1Q satisfying event conditions may suffice as described earlier. First, an acceleration sensor 1F, a gas sensor 1G, a temperature sensor 1H, and a sound sensor 1I are operated and output values thereof are subjected to signal processing by the signal processing section 12. The event determining section 13 determines whether or not an average value obtained by averaging last five output values of the acceleration sensor 1F exceeds 100 mg as event conditions (f) and, when the average value exceeds 100 mg or, in other words, when the event conditions (f) are satisfied, determines that an earthquake event has occurred. When the event determining section 13 notifies the operation setting section 14 of the occurrence of the earthquake event, the operation setting section 14 refers to the transition patterns stored in the memory 15 and sets an operating parameter for determining associated events. For example, changes are made to an operating parameter for setting resolution of a gas sensor to a high value or to an operating parameter for setting sampling intervals of the gas sensor to a short value. In addition, event conditions (g) for determining a gas leakage event and event conditions (h) for determining a fire event as associated events are set. At this point, a priority of the gas leakage event is set to 1 and a priority of the fire event is set to 2. The event conditions (g) are, for example, whether or not a rate of change of last ten output values of the gas sensor 1G exceeds 20%. In addition, the event conditions (h) are, for example, when output values and previous output values of the temperature sensor 1H are compared with each other and a difference between the output values is obtained five times, whether or not any of the differences exceeds 5° C.

Subsequently, when the event conditions (g) are satisfied, the event determining section 13 determines an occurrence of a gas leakage event. When the event determining section 13 notifies the operation setting section 14 of the occurrence of the gas leakage event, the operation setting section 14 refers to the transition patterns stored in the memory 15 and sets an operating parameter for determining associated events. For example, changes are made to an operating parameter for setting transmission intervals to a short value, to an operating parameter for setting resolution of the sound sensor 1I to a high value, or to an operating parameter for setting sampling intervals of the sound sensor 1I to a short value. In addition, event conditions (i) for determining a human detection event and event conditions (j) for determining a fire event as associated events are set. At this point, a priority of the human detection event is set to 2 and a priority of the fire event is set to 1. The event conditions (i) are, for example, whether or not any of last 500 output values of the sound sensor 1I exceeds 80 dB. In addition, the event conditions (j) are, for example, when a variable f (gas) is a value obtained by dividing 200 with the rate of change used to determine the gas leakage event, whether or not an average value of f (gas)-number of output values of the temperature sensor 1H exceeds 40° C.

When the event conditions (j) are satisfied or when the event conditions (i) and the event conditions (j) are satisfied at the same time, the event conditions (i) with the higher priority are prioritized and the event determining section 13 determines an occurrence of the fire event. When the event determining section 13 notifies the operation setting section 14 of the occurrence of the fire event, the operation setting section 14 refers to the transition patterns stored in the memory 15 and sets an operating parameter for determining associated events. For example, operating parameters of a gain and sampling intervals of an infrared sensor 1J are set and the infrared sensor 1J is changed from a sleep state to an operational state. In this case, for the gain of the infrared sensor 1J, a value higher than a normal value is set in a transition pattern to enable a state of the fire to be determined in detail. Therefore, an operating parameter of a high gain is set in accordance with the transition pattern. In a similar manner, for the sampling intervals, an operating parameter which provides shorter sampling intervals than normal is set in accordance with a transition pattern. In addition, event conditions (k) for determining a fire source detection event as an associated event are set. The event conditions (k) are, for example, when a variable f (temperature) is a value obtained by dividing 10 with an average value used to determine the fire event, whether or not a rate of change of last 10 output values of the infrared sensor 1J exceeds f (temperature)° C.

As described above, since there are risks of gas leakage and fire when an occurrence of an earthquake event is determined, operating parameters for determining operations of the sensors 1F to 1J which are required to determine occurrences of a gas leakage event and a fire event which are associated events and determining associated event conditions (g) and (h) are changed to values more advantageous for determining the occurrences of the associated events. In addition, the occurrences of the gas leakage event and the fire event which are the associated events are determined when output values of the sensors 1F to 1J having operated in accordance with the operating parameters satisfy the associated event conditions (g) and (h) which correspond to the occurrence of the associated events.

In a similar manner, when an occurrence of a gas leakage event is determined, in addition to reducing transmission intervals in order to urgently notify gas leakage information, operating parameters for determining operations of the sensors 1F to 1J which are required to determine occurrences of a fire event and a human detection event and determining associated event conditions (i) and (j) are changed in order to determine fire information and whether or not there is anybody left behind in consideration of an increased risk of fire due to the gas leakage. In addition, the occurrences of the fire event and the human detection event which are the associated events are determined when output values of the sensors 1F to 1J having operated in accordance with the operating parameters satisfy the associated event conditions (i) and (j) which correspond to the occurrence of the associated events.

As described above, in accordance with a state of occurrence of an event, an operating parameter of a sensor required to determine an occurrence of an associated event can be changed to a value more advantageous for determining the occurrence of the associated event and respective sections of the sensor system 10 including the sensors 1A to 1Q and the communicating section 16 can be appropriately controlled.

Second Specific Example

Figure 11:
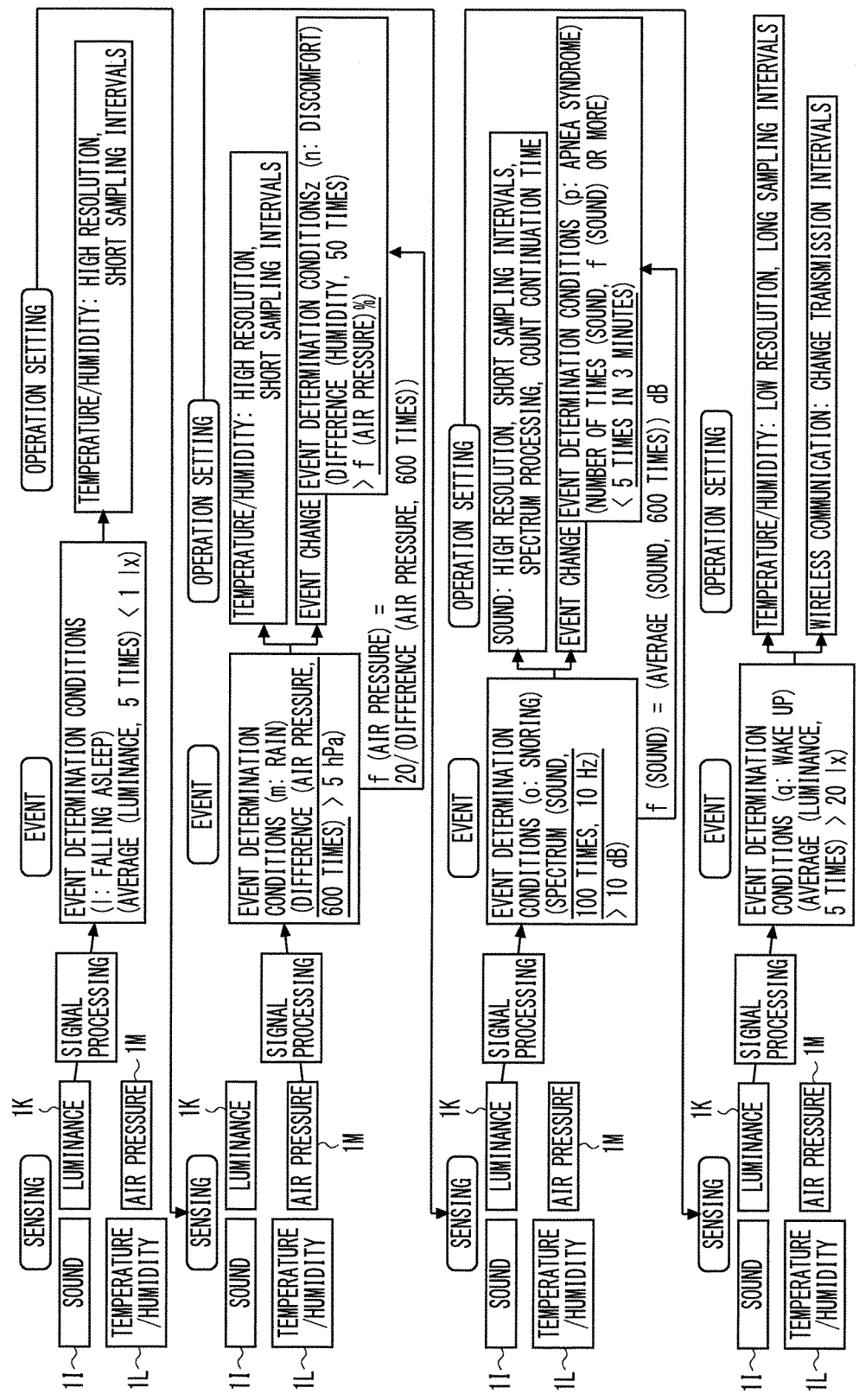
FIG. 11 is a diagram showing a second specific example of operations in a sensor system.

FIG. 11 is a diagram showing a second specific example of operations in the sensor system 10. The second specific example represents an example of operations during sleep by the sensor system 10 installed in a user's bedroom. First, the sound sensor 1I, a luminance sensor 1K, a temperature/humidity sensor 1L, and an air pressure sensor 1M are operated and output values thereof are subjected to signal processing by the signal processing section 12. The event determining section 13 determines whether or not an average value obtained by averaging last five output values of the luminance sensor 1K is below 1 lx as event conditions (l) and, when the average value is below 1 lx or, in other words, when the event conditions (l) are satisfied, determines that a falling-asleep event has occurred. When the event determining section 13 notifies the operation setting section 14 of the occurrence of the falling-asleep event, the operation setting section 14 refers to the transition patterns stored in the memory 15 and sets an operating parameter for determining associated events. For example, changes are made to an operating parameter for setting resolution of the temperature/humidity sensor 1L to a high value or to an operating parameter for setting sampling intervals of the temperature/humidity sensor 1L to a short value. In addition, event conditions (m) for determining a rainfall event as an associated event are set. The event conditions (m) are, for example, when output values and previous output values of the air pressure sensor 1M are compared with each other and a difference between the output values is obtained 600 times, whether or not any of the differences exceeds 5 hPa.

Subsequently, when the event conditions (m) are satisfied, the event determining section 13 determines an occurrence of a rainfall event. When the event determining section 13 notifies the operation setting section 14 of the occurrence of the rainfall event, the operation setting section 14 refers to the transition patterns stored in the memory 15 and sets an operating parameter for determining associated events. For example, changes are made to an operating parameter for setting resolution of the temperature/humidity sensor 1L to a high value or to an operating parameter for setting sampling intervals of the temperature/humidity sensor 1L to a short value. In addition, event conditions (n) for determining a discomfort event and event conditions (o) for determining a snoring event as associated events are set. For example, as the event conditions (n), when a variable f (air pressure) is a value obtained by dividing 20 by the difference used for determining the rainfall event, output values and previous output values with respect to humidity as measured by the temperature/humidity sensor 1L are compared with each other and a difference between the output values is calculated 50 times and a determination is made on whether or not any of these differences exceeds f (air pressure). Furthermore, the event conditions (o) are, for example, whether or not a sound at 10 Hz as obtained by 100 measurements of a sound spectrum by the sound sensor 1I exceeds 10 dB.

When the event conditions (o) are satisfied, the event determining section 13 determines an occurrence of a snoring event. When the event determining section 13 notifies the operation setting section 14 of the occurrence of the snoring event, the operation setting section 14 refers to the transition patterns stored in the memory 15 and sets an operating parameter for determining associated events. For example, an operating parameter for setting resolution of the sound sensor 1I to a high value or an operating parameter for setting sampling intervals of the sound sensor 1I to a short value is set. In addition, event conditions (p) for determining an apnea syndrome event and event conditions (q) for determining a wake-up event as associated events are set. For example, as the event conditions (p), when a variable f (sound) dB is an average value of sounds used for determining the snoring event, the number of times the output value of the sound sensor 1I equals or exceeds f (sound) dB is counted, and a determination is made on whether or not the number of times exceeds five in three minutes. In addition, the event conditions (q) are, for example, whether or not an average value obtained by averaging last five output values of the luminance sensor 1K exceeds 5 lx.

Subsequently, when the event conditions (p) are satisfied, the event determining section 13 determines an occurrence of an apnea syndrome event. When the event determining section 13 notifies the operation setting section 14 of the occurrence of the apnea syndrome event, the operation setting section 14 stores the number of occurrences and the occurrence times of day of the apnea syndrome event in the memory 15. In addition, when the event conditions (q) are satisfied, the event determining section 13 determines an occurrence of a wake-up event. When the event determining section 13 notifies the operation setting section 14 of the occurrence of the wake-up event, the operation setting section 14 refers to the transition patterns stored in the memory 15 and sets an operating parameter for determining associated events. For example, an output value of each sensor acquired during sleep and contents of determined events are transmitted to the application server 4. Furthermore, changes are made to an operating parameter for setting resolution of the temperature/humidity sensor 1L to a low value or to an operating parameter for setting sampling intervals of the temperature/humidity sensor 1L to a long value. In addition, event conditions (l) for determining a falling-asleep event as an associated event are set. In other words, in the transition pattern for determining events for sleeping, a return is made to a state of determining a first event (an initial state).

When the occurrence of a falling-asleep event is determined as described above, temperature/humidity information is output in detail in order to acquire information related to comfortability, when a rainfall event is determined, operations of the temperature/humidity sensor 1L are further changed in order to detect a change in a rise in humidity due to rainfall, and when a snoring event is determined, the operation setting of the sound sensor 1I is changed and set in order to assess a quality of snoring and to enable an apnea syndrome event to be determined.

Third Specific Example

Figure 12:
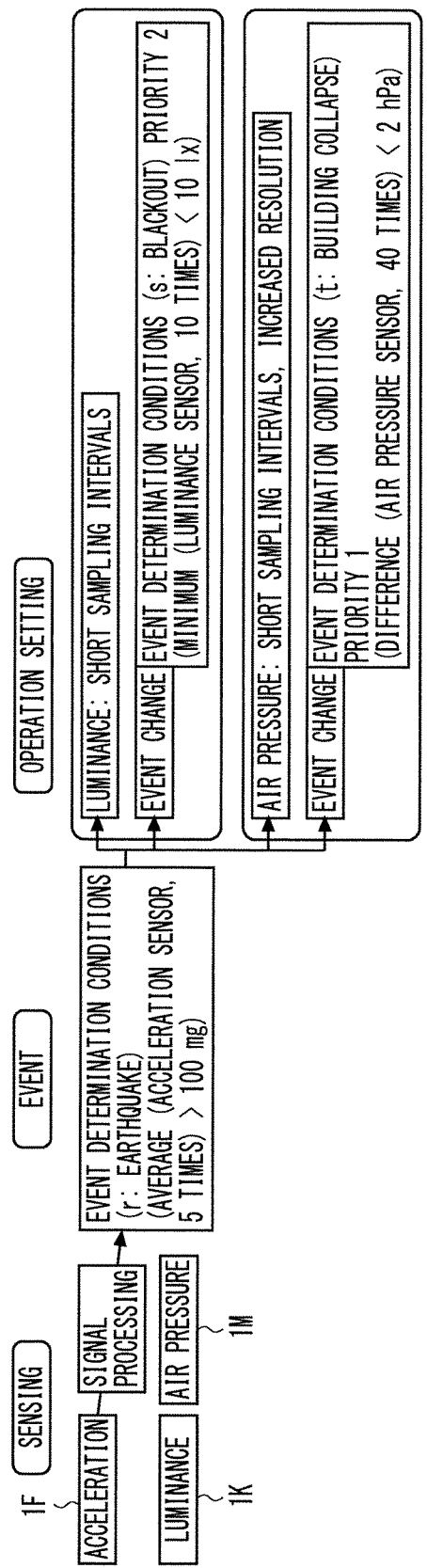
FIG. 12 shows an example of operations of a sensor system installed in a building upon an occurrence of an earthquake.

FIG. 12 shows an example of operations of the sensor system 10 installed in a building upon an occurrence of an earthquake. First, the acceleration sensor 1F, the luminance sensor 1K, and the air pressure sensor 1M are operated and output values thereof are subjected to signal processing by the signal processing section 12. The event determining section 13 determines whether or not an average value obtained by averaging last five output values of the acceleration sensor 1F exceeds 100 mg as event conditions (r) and, when the average value exceeds 100 mg or, in other words, when the event conditions (r) are satisfied, determines that an earthquake event has occurred. When the event determining section 13 notifies the operation setting section 14 of the occurrence of the earthquake event, the operation setting section 14 refers to the transition patterns stored in the memory 15 and sets an operating parameter for determining associated events. For example, changes are made to an operating parameter for setting sampling intervals of the luminance sensor 1K to a short value. In addition, event conditions (s) for determining a blackout event as an associated event are set. The event conditions (s) are, for example, when output values and previous output values of the luminance sensor 1K are compared with each other and a difference between the output values is obtained 10 times, whether or not a minimum value of any of the differences exceeds 10 lx. Furthermore, with the operation setting section 14, changes are made to an operating parameter for setting sampling intervals of the air pressure sensor 1M to a short value and to an operating parameter for setting resolution of the air pressure sensor 1M to a high value. In addition, event conditions (t) for determining a building collapse event as an associated event are set. The event conditions (t) are, for example, when output values and previous output values of the air pressure sensor 1M are compared with each other and a difference between the output values is obtained 40 times, whether or not any of the differences exceeds 2 hPa.

As described above, when the occurrence of an earthquake event is determined, by setting operating parameters which are advantageous for determining the occurrence of a blackout event or a building collapse event which are associated events, the sensors 1A to 1Q and the communicating section 16 of the sensor system 10 are able to operate appropriately in an autonomous manner.

Fourth Specific Example

Figure 13:
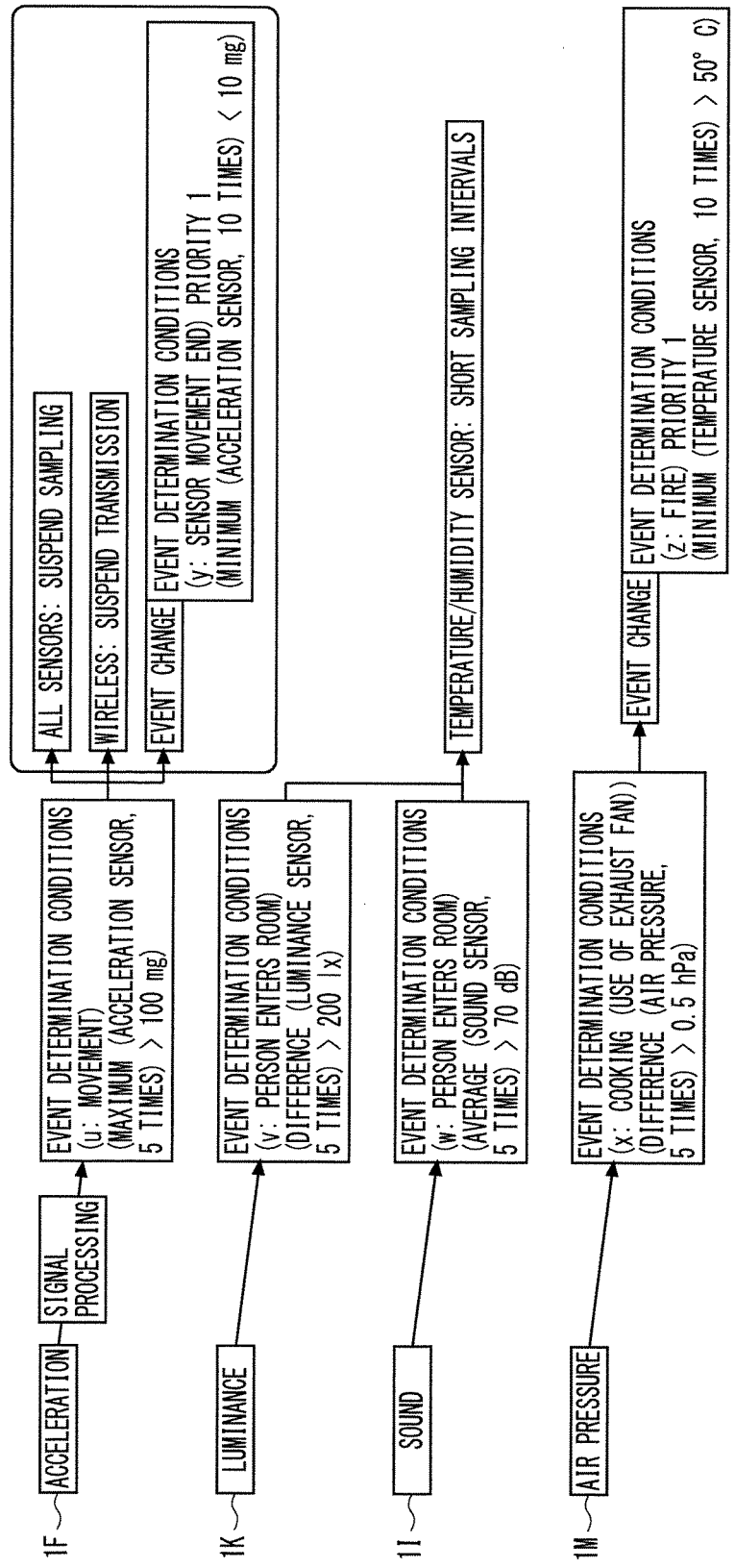
FIG. 13 shows an example of operations of a sensor system placed in a room of a user.

FIG. 13 shows an example of operations of the sensor system 10 placed in a room of a user. First, the acceleration sensor 1F, the luminance sensor 1K, the sound sensor 1I, and the air pressure sensor 1M are operated and output values thereof are subjected to signal processing by the signal processing section 12.

The event determining section 13 compares output values and previous output values of the luminance sensor 1K with each other to obtain a difference between the output values five times, and determines whether or not any of the differences exceeds 200 lx as event conditions (v). In addition, the event determining section 13 determines whether or not an average of last five output values of the sound sensor 1I exceeds 70 dB as event conditions (w). When the event conditions (v) or the event conditions (w) are satisfied, the event determining section 13 determines that a room entry event has occurred and notifies the operation setting section 14 of the occurrence of the room entry event. The operation setting section 14 refers to the transition patterns stored in the memory 15 and sets an operating parameter. For example, a change is made to an operating parameter for setting sampling intervals of the temperature/humidity sensor 1L to a short value.

In addition, the event determining section 13 compares output values and previous output values of the air pressure sensor 1M with each other to obtain a difference between the output values five times, and determines whether or not any of the differences exceeds 0.5 hPa as event conditions (x). When the difference exceeds 0.5 hPa or, in other words, when the event conditions (x) are satisfied, the event determining section 13 determines that an exhaust fan has been used and a cooking event has occurred. When the event determining section 13 notifies the operation setting section 14 of the occurrence of the cooking event, the operation setting section 14 refers to the transition patterns stored in the memory 15 and sets an operating parameter for determining associated events. For example, event conditions (z) for determining a fire event as an associated event are set. The event conditions (z) are, for example, whether or not a minimum value among last five output values of the temperature sensor 1H exceeds 50° C.

Subsequently, the event determining section 13 determines whether or not a maximum value among last five output values of the acceleration sensor 1F exceeds 100 mg as event conditions (u) and, when the maximum value exceeds 100 mg or, in other words, when the event conditions (u) are satisfied, determines that a movement event has occurred. When the event determining section 13 notifies the operation setting section 14 of the occurrence of the movement event, the operation setting section 14 refers to the transition patterns stored in the memory 15 and sets an operating parameter. For example, when the sensor system 10 is being moved in order to change an installation position of the sensor system 10, since measurements need not be performed until the sensor system 10 is installed once again, an operating parameter is set for stopping measurements by all sensors by, for example, setting sampling intervals to infinity. In addition, transmission by the communicating section 16 is also suspended.

Subsequently, the acceleration sensor 1F is moved after a lapse of a prescribed amount of time and event conditions (y) for determining a movement end event as an associated event are set. The event conditions (y) are, for example, whether or not a minimum value among last five output values of the acceleration sensor 1F is below 10 mg.

As described above, normally, when the room entry event or the cooking event is determined and the sensor system 10 is moved, operations of all of the sensors 1A to 1Q can be suspended and unnecessary operations can be suppressed.

Fifth Specific Example

Figure 14:
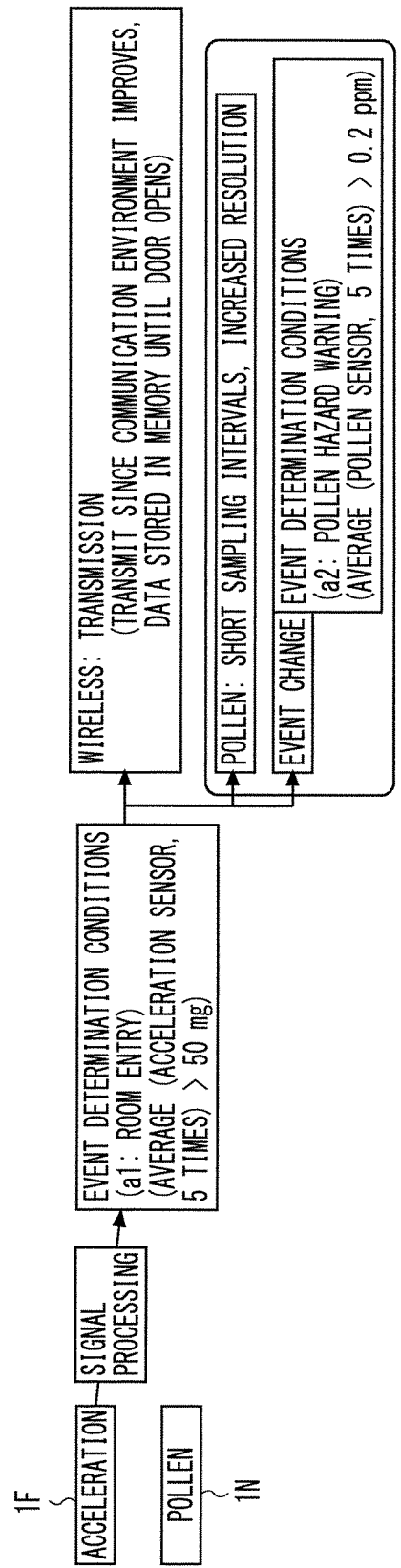
FIG. 14 shows an example of operations of a sensor system installed on a door or a window.

FIG. 14 shows an example of operations of the sensor system 10 installed on a door or a window. First, the acceleration sensor 1F and a pollen sensor 1N are operated and output values thereof are subjected to signal processing by the signal processing section 12. The event determining section 13 determines whether or not an average value obtained by averaging last five output values of the acceleration sensor 1F exceeds 50 mg as event conditions (a1) and, when the average value exceeds 50 mg or, in other words, when the event conditions (a1) are satisfied, determines that a door opening event has occurred. When the event determining section 13 notifies the operation setting section 14 of the occurrence of the door opening event, the operation setting section 14 refers to the transition patterns stored in the memory 15 and sets an operating parameter for determining associated events. For example, operation settings are performed so that output values of the respective sensors 1A to 1Q are stored in the memory 15 until a door or a window opens and, when an occurrence of a door opening event is determined or, in other words, when the door or the window is opened and a communication environment is improved, the output values of the respective sensors 1A to 1Q are transmitted to the application server 4.

In addition, an operating parameter for shortening sampling intervals of the pollen sensor 1N and an operating parameter for increasing resolution of the pollen sensor are set. Furthermore, event conditions (a2) for determining a pollen warning event as an associated event are set. The event conditions (a2) are, for example, whether or not an average value obtained by averaging last five output values of the pollen sensor 1N exceeds 0.2 ppm.

As described above, when the occurrence of a door opening event is determined, by performing operation settings of the communicating section 16 and setting operating parameters which are advantageous for determining the occurrence of a pollen warning event which is an associated event, the sensors 1A to 1Q and the communicating section 16 of the sensor system 10 are able to operate appropriately in an autonomous manner.

Sixth Specific Example

Figure 15:
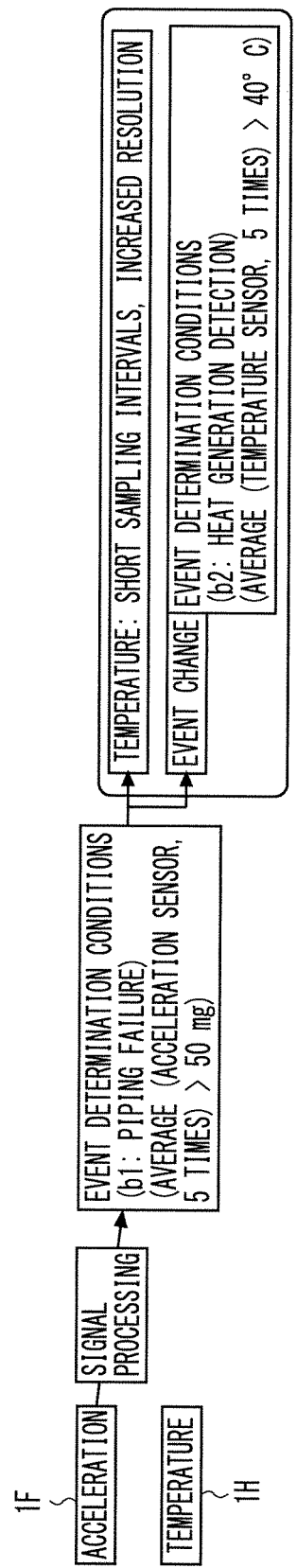
FIG. 15 shows an example of operations of a sensor system installed in piping of a factory.

FIG. 15 shows an example of operations of the sensor system 10 installed in piping of a factory. First, the acceleration sensor 1F and the temperature sensor 1H are operated and output values thereof are subjected to signal processing by the signal processing section 12. The event determining section 13 determines whether or not an average value obtained by averaging last five output values of the acceleration sensor 1F exceeds 50 mg as event conditions (b1) and, when the average value exceeds 50 mg or, in other words, when the event conditions (b1) are satisfied, determines that a piping failure event has occurred. When the event determining section 13 notifies the operation setting section 14 of the occurrence of the piping failure event, the operation setting section 14 refers to the transition patterns stored in the memory 15 and sets an operating parameter for determining associated events. For example, an operating parameter for shortening sampling intervals of the temperature sensor 1H which determines temperature of the piping and an operating parameter for increasing resolution of the temperature sensor are set. In addition, event conditions (a2) for determining a heat generation detection event as an associated event are set. The event conditions (a2) are, for example, whether or not an average value obtained by averaging last five output values of the temperature sensor 1H exceeds 40° C.

As described above, when the occurrence of a piping failure event is determined, by setting operating parameters which are advantageous for determining the occurrence of a heat generation detection event which is an associated event, the sensors 1A to 1Q and the communicating section 16 of the sensor system 10 are able to operate appropriately in an autonomous manner.

According to the embodiment and the specific examples described above, since operating parameters are appropriately set in accordance with a state of occurrence of an event, the sensors 1A to 1Q and the communicating section 16 of the sensor system 10 are able to operate appropriately in an autonomous manner and, since unnecessary operations are no longer performed, power consumption can be minimized. Therefore, when the sensor system 10 is driven by a battery, the frequency of battery replacement can be reduced and maintenance costs can be suppressed.

REFERENCE SIGNS LIST 1A to 1Q Sensor
1 Composite sensor unit
2 User terminal
3 Gateway
4 Application server
10 Sensor system
12 Signal processing section
13 Event determining section
14 Operation setting section
15 Memory
16 Communicating section

The invention claimed is:

1. A sensor system which has a plurality of sensors and which is capable of measuring a plurality of parameters corresponding to physical quantities of a measurement object, the sensor system comprising:
   operation setting section configured to set operations of the plurality of sensors;
   event determining section configured to determine that a prescribed event has occurred when output values of at least one sensor among the plurality of sensors satisfy event conditions corresponding to an occurrence of the prescribed event; and
   transmitting section configured to transmit output values of the sensors to a receiving apparatus which is externally provided,
   wherein when the event determining section determines that the prescribed event has occurred, the operation setting section is configured to change an operational state of the sensor which, among the plurality of sensors, is required to determine an occurrence of an associated event which is an event that occur in association with the occurrence of the prescribed event,
   wherein changing an operational state of the sensor which is required to determine an occurrence of the associated event involves setting a resolution of the sensor, sampling intervals of data by the sensor, or transmission intervals of an output value from the sensor, to a value more advantageous for determining the occurrence of the associated event, and
   when the event determining section determines that the prescribed event has occurred, the operation setting section is configured to cause resolution of the sensor required to determine the occurrence of the associated event to be increased, cause the sampling intervals of data by the sensor to be shortened, or cause the transmission intervals of an output value from the sensor to be shortened.

2. The sensor system according to claim 1, wherein the event determining section determines an occurrence of the associated event when output values of the sensors including the sensors required to determine the occurrence of the associated event among the plurality of sensors satisfy associated event conditions corresponding to the occurrence of the associated event.

3. The sensor system according to claim 1, wherein
   before the event determining section determines that the prescribed event has occurred,
   the operation setting section is configured to set at least one of a resolution of the sensor which is required to determine an occurrence of the associated event, sampling intervals of data by the sensor, or communication intervals of wireless communication from the sensor, to a power saving mode in which power consumption is as low as possible.

4. The sensor system according to claim 1, wherein associated event conditions for determining occurrence of the associated event are changed in accordance with, when output values of at least a part of sensors among the plurality of sensors satisfy event conditions corresponding to an occurrence of an prescribed event, an output value of at least one sensor among the plurality of sensors.

5. The sensor system according to claim 1, wherein
when the event determining section determines an occurrence of the associated event,
the operation setting section sets an operating parameter of the sensor that, among the plurality of the sensors, is required to determine an occurrence of a second associated event, which is an event that occur in further association with the occurrence of the associated event, to a value more advantageous for determining the occurrence of the second associated event, and
the event determining section determines the occurrence of the second associated event when output values of the sensors including the sensors required to determine the occurrence of the second associated event among the plurality of sensors satisfy second associated event conditions corresponding to the occurrence of the second associated event, and
repetitively performs a process that determine the occurrence of a next event when output values of sensors including the sensors required to determine the occurrence of the next event among the plurality of sensors satisfy next event conditions corresponding to the occurrence of the nest event, on the next event further associated with the second associated event.

6. The sensor system according to claim 1, wherein the sensor system is a composite sensor unit in which the plurality of sensors that detect different the parameters corresponding to the physical quantities are arranged inside a single package.

7. The sensor system according to claim 1, wherein each of the plurality of sensors is a composite sensor unit in which a plurality of sensors that detect different the parameters corresponding to the physical quantities are arranged inside a single package, and the sensor system is comprised by a plurality of composite sensor units arranged in a prescribed area.

* * * * *